Patented May 26, 1953

2,639,698

UNITED STATES PATENT OFFICE 2,639,698

INTERNAL-COMBUSTION ENGINE

Charles Harlan Ward, Minneapolis, Minn.

Application October 1, 1947, Serial No. 777,283

5 Claims. (Cl. 123—56)

This invention relates to improvements in internal combustion engines. I have endeavored to endow two cycle operation with the practicality of four cycle operation by means of the features of my invention, which basically consist of achieving a faster and more thorough exhaust removal and a more adequate charging of the explosion cylinders, plus advantageous control of such charging. Although my invention is encompassed by these broad aspects, it must be pointed out that there are, as will be set forth in the claims, numerous features that are functionally inter-related and/or complementary, which will be set forth individually as claims.

I accomplish the objects of my invention by a novel functional arrangement. The means and method for such accomplishment will be set forth in the following detailed specification.

The structure to be hereinafter described constitutes one effective embodiment of my invention. Other embodiments would be readily devised by those skilled in the art.

The invention is clearly defined and pointed out in the claims.

A structure constituting an effective and preferred embodiment of the features of my invention is clearly illustrated in the accompanying drawings, in which.

Figure 2:
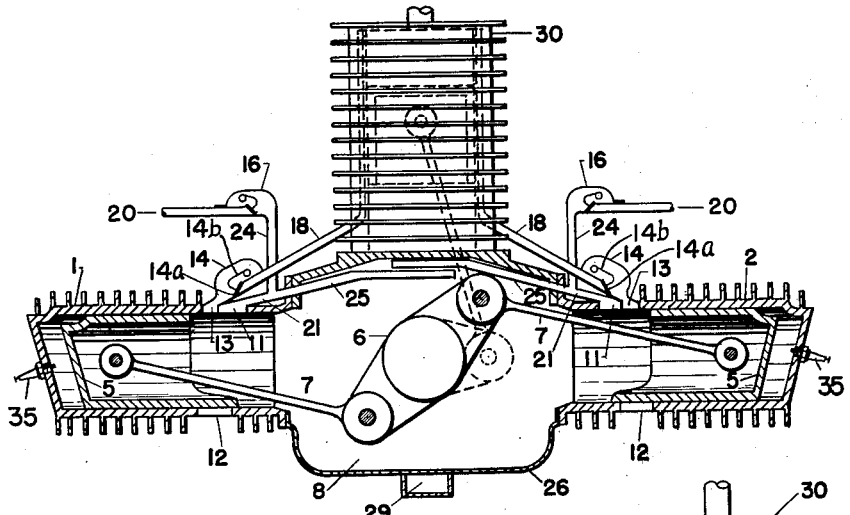
Figure 2 is a vertical section taken along line 2—2 of Figure 1.
Figure 3:
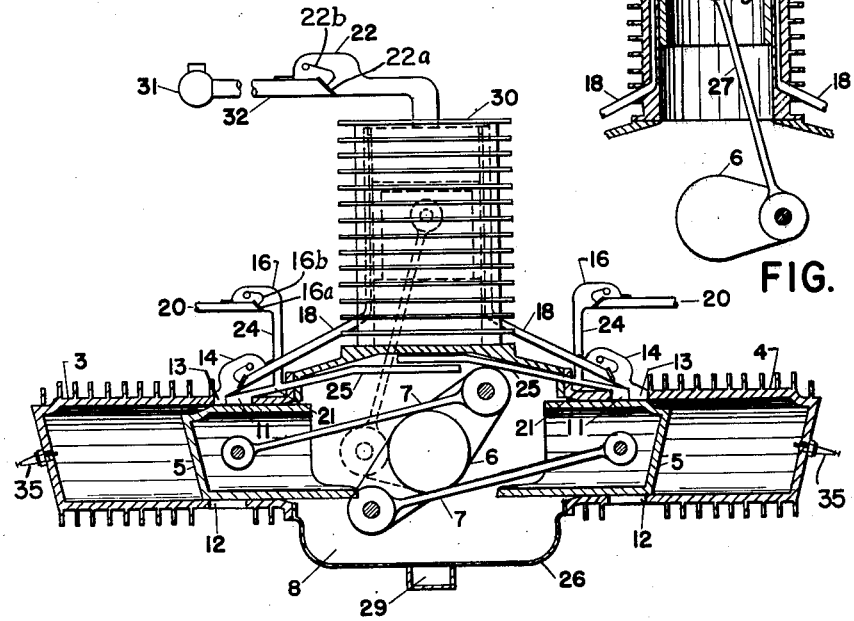
Figure 3 is a vertical section taken along line 3—3 of Figure 1.

Figure 2 consists of the same number and kind of parts as Figure 3 and they have therefore been numbered identically. Both Figures 3 and 2 are identities pictured at the same time which illustrates that each engine unit as represented by each figure is functionally separated by 180 degrees so that if the crank shaft as shown in Figure 2 were to rotate clockwise 180 degrees, Figure 2 would appear as Figure 3.

Figure 1:
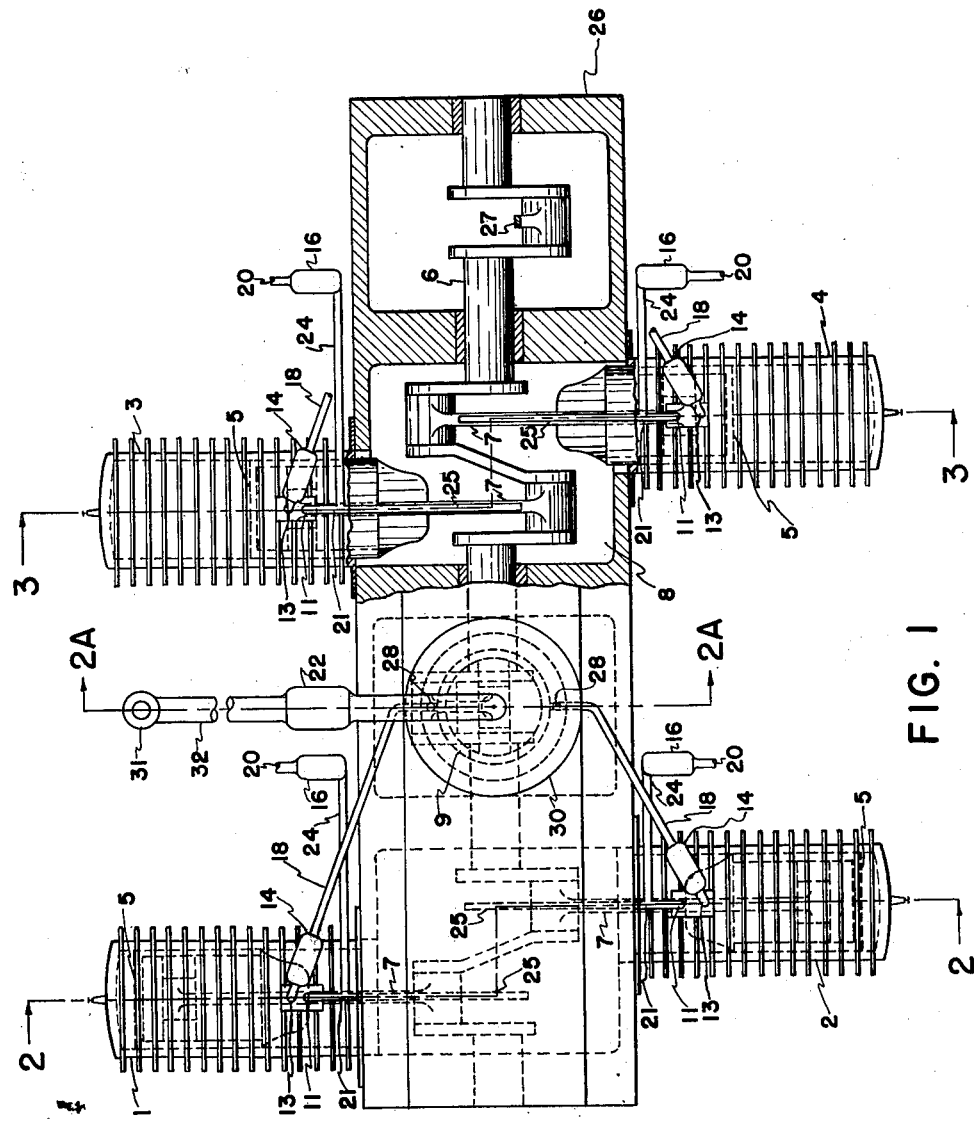
Figure 1 is a plan view as seen from the top with part broken away.

Figure 1 indicates that engine units are additive and that this embodiment of my invention consists of two such units solely for the purpose of illustrating the additive-by-units feature, each unit of which is actually an independently-operating engine. They therefore may be considered to be separate engines each of which is constructed so that while having a common crank shaft 6 and a common crank case 26, they nevertheless actually are, from an operating standpoint, definite and separate unit engines.

Figure 1 illustrates the way in which Figures 2 and 3, as separate engine units, are joined so as to become a single engine. It is a top view in which is illustrated the disposition of the firing pistons and the air independence existing between the crank chambers 8 of two engine units.

Referring to the drawings, I provide a plurality of engine cylinders, the structure illustrated (see Fig. 1) having two engine units so joined as to be a single engine and each unit consisting of one charging cylinder and two explosion cylinders. The explosion cylinders are designated 1, 2, 3, and 4. All cylinders are represented as being air-cooled which feature is not part of my invention.

Explosion pistons 5 (Fig. 2) are illustrated as approaching maximum compression preparatory to being fired. The explosion pistons 5 (Fig. 3) are illustrated at the same moment as approaching the end of the power stroke.

Since Figure 3 is identical in all respects to Figure 2 except for the 180 degrees phase relationship of the respective pistons, I shall describe in detail only Figure 2.

Referring to the drawings an engine is shown comprising two pairs of firing cylinders designated respectively 1, 2 and 3, 4. The two pairs of firing cylinders actually comprise two engines or a twin or double engine. The said firing cylinders have reciprocable therein the firing pistons 5. Said pistons are connected to a common crankshaft 6 by connecting rods 7. Said crankshaft 6 is disposed in and journaled in a crank case 26. Crank case 26 has chambers 8 therein for each pair of the said firing cylinders. Since the two said engines are identical and the same reference characters refer to the same parts thereon, a description of one will suffice for both. Each cylinder 1, 2, 3 and 4 has an exhaust port 12 at one side thereof, which exhaust port is of considerable length longitudinally of the cylinders and will be of a length comprising substantially 100 degrees circumferential movement of crankshaft 6 and a corresponding movement of pistons 5. The skirt shown on pistons 5 is made of greater length at the side of the cylinder having the port 12 therein so that said port is not opened when the piston 5 is at maximum compression or closer to the top or closed end of its cylinder.

Each cylinders 1, 2, 3 and 4 has an inlet port 13 therein at the side of the cylinder opposite the exhaust port 12. Each of said cylinders has an auxiliary inlet port 11 adjacent the port 13 but farther from the closed end of the cylinders. The cylinders 1, 2, 3 and 4 open into the respective chamber 8 in the crank case. As clearly shown in the drawings the cylinders 1 and 2 and the cylinders 3 and 4 are oppositely disposed and extend at opposite sides of the crank case. A charging cylinder 30 is provided shown as having its axis extending at right angles to the cylinders 1 and 2 and extending from one side, namely the upper side of crank case 26. Cylinder 30 has a chamber 10 therein and a piston 9 fits in chamber 10 and is reciprocable in said chamber and chamber 30, said piston 9 being connected by a connecting rod 27 to the crankshaft 6, as shown in Fig. 3A. The cylinder 30 has passages 28 extending along the sides thereof and which extend from the top of chamber 10 to adjacent the bottom thereof. Said passages 28 at their lower ends communicate with conduits 18 extending from cylinder 30 at opposite sides, which conduits extend to the chamber of a valve 14 closely adjacent the main inlet ports 13. Valve 14 has a valve portion proper 14a which closes the end of conduit 18. Said valve portion 14a is held in closed position by a suitable spring 14b and this spring is so set that valve 14a cannot open until a sufficient pressure has been attained. The chamber 10 in cylinder 30 is connected through a conduit 32 to a carburetor 31. Conduit 32 has a valve chamber therein for a valve 22 having a valve portion proper 22a which is held in closed position by a suitable spring 22b. A conduit 20 opening to the atmosphere communicates with the chamber of a valve 16 which has a valve portion proper 16a held in closed position by a suitable spring 16b. The chamber of valve 16 communicates with a conduit 24 which extends to a pipe or conduit 25 and to a conduit 21 axially aligned with conduit 25. Conduit 21 extends to the auxiliary inlet port 11. Pipe 25 extends along the top of chamber 8 within crank case 26 and has an open end adjacent said top, as shown in Figs. 2 and 3. Spark plugs 35 are shown at the ends of cylinders 1, 2, 3 and 4. Crank case 26 has a small chamber 29 at its lower side forming a sump which will connect with chamber 8 through a suitable screen not shown.

It will readily be seen that by rotation of crank 6, piston 9 will be reciprocated by the piston rod 27 and that any gas or charge in cylinder 30 above piston 9 will be compressed.

By clockwise movement of crank shaft 6, piston 9 would come to a position of maximum compression, if there were no outlet from chamber 10, when it makes its nearest approach to the cylinder head of cylinder 30. In this embodiment of my invention I have so arranged that piston 9 shall reach the point nearest to its cylinder head 135 degrees (of clockwise turning of the crankshaft) before pistons 5 shall reach the point nearest to their respective cylinder heads. Operationally, in setting forth claims, I shall state that piston 9 is more than 90 degrees ahead of pistons 5, because it is at this point that my "intake booster plan" begins to be operative even if less effective. Since my invention rests upon the fact that such charging cylinder can be made more useful, especially if adapted according to my invention embodiment, by employing greater than a 90 degree differential between charging and firing pistons, I submit that it is an essential feature. It is the basis for my "intake booster plan" which will be more particularly described elsewhere in this specification.

Figure 2A:
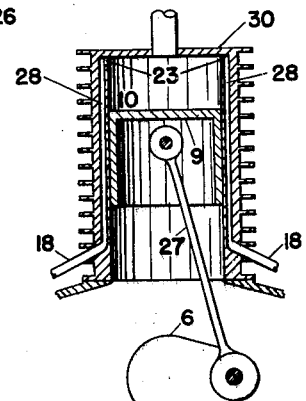
Figure 2A is a cut-away section of the charging cylinder and contained piston shown in Figure 2 along line 2A—2A.

The cubic capacity of cylinder chamber 10 of Fig. 2A shall be approximately equal to the combined cubic content of the firing cylinders it feeds and shall be such that at fullest compression a pressure of 50 pounds/sq. in. would develop. To avoid considerable dissipation of power involved in developing this pressure to maximum, I have provided that valves 14 which control the flow from chamber 10 to the two firing cylinders shall be held in a closed position by a spring attachment capable of delivering pressure equivalent to 35 pounds/sq. in. This prevents the development of the 50 pounds/sq. in. maximum compression pressure in chamber 10 and elsewhere in the adjoining lines, yet permits getting a rush-of-air after valves 14 open and until piston 9 reaches the position of nearest approach to its corresponding cylinder head.

The exposive vapors leave chamber 10 (Fig. 2A) simultaneously under pressure through openings 23 which give entrance to cast-in passages 28 leading to pipes 18. Valves 14, pressure activated by 35 pounds/sq. in. of pressure, open and are held open as long as pressure maintains. The explosive vapors enter the chambers of cylinders 1 and 2 simultaneously through ports 13 after which pistons 5 on their compression stroke cover ports 13 and compression of the explosive charge is begun.

When 35 pounds/sq. in. of pressure is exerted upon valves 14, pistons 5 will be in a position near to crank shaft 6 and just beginning their compression stroke. As pistons 5 begin to move in the direction of their respective cylinder heads, a suction or decrease of pressure will establish in closed crank chamber 8 due to decreased internal pressures. The increasing cubic capacity of crank chamber 8 will be filled by outside air being "pulled" through pipe openings 20 and through valves 16, which are lightly held in a closed position by suitable spring action. Air moves through pipes 24 and empties into pipes 21. Air here divides in pipes 21 so that one portion moves through pipes 25 and empties into crank chamber 8 while the other portion moves into chamber 8 through pipes 21 and ports 11.

To picture the functions and timing which are illustrated in this embodiment of my invention and to show that the functions are interrelated and complementary, it is necessary to imagine a circle. This circle represents the path traveled individually by each of the cranks of the crank shaft at the point where the connection rods 7 of any single firing piston attaches. If the pistons 5 are at full compression, they may be said to be at zero degrees. By clockwise turning of the crank shaft, the pistons depress in their respective cylinders until they reach 115° at which point ports 13 begin to uncover. At 130° exhaust ports 12 begin to uncover. They will close, therefore, at 230° and so be open through 100 degrees. At 140° crank chamber 8 air begins to pass through ports 11 to enter the firing cylinder chambers. At 195° fuel injection begins to occur through ports 13 because the pressure of cylinder 30 chamber 10 is at 35 pounds/sq. in. At 225° piston 9 of cylinder 30 is at the point nearest to its cylinder head. The port 11 closes at 220 degrees travel of the crank or piston and the exhaust port as stated closes at 230 degrees. The fuel injection ceases and valve 13 closes at 245 degrees.

When the desired maximum of compression is reached in explosion cylinders 1 and 2 or shortly thereafter as good practice dictates, explosion cylinders 1 and 2 are fired simultaneously by conventional means to start the power stroke.

Pistons 5 begin to move away from their respective cylinder heads and in so doing decrease the cubic content of chamber 8, which is a closed chamber, to thereby increase the pressure in chamber 8. Closed crank chamber 8 is so constructed with respect to cubic capacity as to develop approximately 4½ pounds/sq. in. pressure by the time pistons 5 have approached to ports 11 on the power stroke. It must be pointed out that when pistons 5 have reached the exact end of their power stroke that crank chamber 8 would contain a pressure of 6 pounds/sq. in. if there were no outlet provided. However ports 11 do uncover to provide outlet when a pressure of 4½ pounds/sq. in. has developed by reason of having been so constructed. This avoids dissipation of power that would occur if it were permitted to develop the full potential of 6 pounds/sq. in. This is an essential novelty of my invention and enables me to provide my "sweep booster plan" for the more advantageous use of crank chamber 8 air. This "sweep booster plan" will be explained more particularly elsewhere in this specification.

As pistons 5 move through their power stroke, intake ports 13 are uncovered first but the exploded, expanding gases cannot penetrate pipes 18 and beyond because valves 14 (like all valves here illustrated) open only in one direction. Immediately after pistons 5 uncover ports 13, they also uncover exhaust ports 12 and the exploded gases under their own pressures are in a large degree expelled.

Since I have named exhaust removal as a major aspect of my invention, I wish to point out what I have done that is new and how it is useful.

My exhaust ports 12 open earlier and stay open longer than others. I have provided much larger exhaust ports 12 which are wider, i. e., much more of the circumference of the explosion cylinder is so used (80°). To understand how much length for purposes of comparison, I set forth 100 degrees—degrees of turn of crank shaft 6. Since any turning of crank shaft 6 will move pistons 5, degrees are a convenient means by which to illustrate length of exhaust ports 12. Although the pistons 5 move near enough to their respective cylinder heads so that ports 11 open to admit outside air to crank chamber 8, it is pointed out that ports 12 are not uncovered. Ports 12 remain covered because pistons 5 have an extended skirt so placed as to cover them (see Fig. 1).

These larger exhaust ports 12 are a feature of my invention. Additionally, I wish to point out that not only does my "intake booster plan" provide a better-controlled explosive charge under greater continuing pressures at a more advantageous time, and with less dissipation of power, but it is also the feature that enables me to delay charging of the firing cylinders and thereby to employ these larger exhaust ports 12. This same "intake booster plan" is also the feature which enables me to employ my "sweep booster plan" for blowing crank chamber 8 air into the explosion cylinder for a longer time as fifty-five degrees (55°) prior to admitting the explosive vapors.

Finally, after the firing pistons 5 have passed their inner extremity as ending their power stroke, it will be noted that exhaust ports 12 remain open longer than in conventional internal combustion engines. The explosion pistons 5 therefore must move much farther into their compression stroke, though not actually compressing, before completely covering the exhaust ports 12. This enables the firing pistons 5 to themselves push-out still more of the exhaust residues before they cover the exhaust ports 12.

This comprehensive exhaust removal lessens the back-pressure to enable a more adequate muffling of the noises of the exhaust.

After pistons 5 uncover ports 13 and ports 12 and continue their power stroke, they next uncover ports 11 to admit the crank chamber 8 air under 4½ pounds/sq. in. of pressure. The first air to enter the firing cylinder chambers will be that contained in pipes 25 which will move through pipes 21 and through ports 11. Pipes 25 are of such length and capacity as to contain a quantity of air sufficient for the greater part of supplying all of the air which will be deposited into the chambers of cylinders 1 and 2. The lesser part of this air so moved from chamber 8 through pipes 25 to the firing cylinders 1 and 2 will consist of air which has passed all of the way into chamber 8 proper and therefore may have become mixed with such oil vapors or droplets as there exist under splashless oiling-system conditions. This air bearing oil (vapor or droplets) moves through pipes 25, pipes 21 and ports 11 to chambers of cylinders 1 and 2. This is an essential feature of my invention in that it is a means of controlling the amount of such vapor-bearing air which will be used and so to control oil-loss excesses. The conduits 25 as above stated will be made of sufficient size to contain nearly all the air supplied through ports 11. This air will thus not have passed into the crank case and will not contain oil, vapor or droplets of oil. It is thus shielded from contact with the oil in the crank case chamber. This shielding is not aimed at complete elimination of oil from crank chamber air. It is a means for providing relatively known amounts of oil vapors or droplets from the crank chamber to the upper, explosion cylinder chambers for complementary lubrication.

When ports 11 begin to uncover, some remaining exhaust particles which have not departed through ports 12 as previously described, begin to be blown out of ports 12 by the rush-of-air entering the chambers of explosion cylinders 1 and 2 through ports 11. This air entering explosion cylinders 1 and 2 from crank chamber 8 functions in part as a coolant for the chambers of explosion cylinders 1 and 2. In addition, since this air enters with a rush which persists at a given minimum intensity (4½ pounds/sq. in. in this embodiment) for a definite number of degrees, I achieve a more complete exhaust removal and, further, an aid in depreciating back pressure so that muffling may be more complete. This in-rushing air persisting at a given minimum pressure for a period of time insures positive removal of all inert gases which may reside in the area of the spark gap to decrease the efficiency of the succeeding ignition. The intensity of the rush, a point of value, is achieved by having a plurality of pistons 5 coacting to decrease the cubic capacity of crank chamber 8.

Immediately, by the clockwise turning of crank shaft 6 to a point where pistons 5 have completely uncovered ports 11 and 12 and then turned an additional few degrees (15 degrees in this embodiment) the pressure in chamber 10 of charging cylinder 30 will have increased to a point at which (in this embodiment 35 pounds/sq. in.) it can reach and force open valves 14 to enable the explosive vapors to begin to enter through ports 13 into the chambers of cylinders 1 and 2 simultaneously. Since ports 12 will still be open, the entrance of the explosive mixture will force out of ports 12 an additional amount of any remaining exhaust residues and thereby introduce an explosive charge into the chambers of explosion cylinders 1 and 2 which is much less encumbered or mixed with residual matter. This fuller, purer explosive charge is in part then, a result of my two "bootster-plans"—plans for providing: First, a rushing-of-air from the crank chamber 8 which rushing air persists at a given minimum pressure for a period of degrees longer than would be advisable or conventional if I had not provided a means for improved charging of the firing cylinders, namely, my "intake booster plant" which postpones charging in order to allow more time to exhaust removal. Second, a rushing-of-explosive-vapor from the charging cylinder 30 which rushing persists at a given minimum pressure for a period of degrees and in which maximum potential is never acheved to unnecessarily dissipate power.

The fuller, purer, fully-controlled explosive charge which is forced into the chambers of cylinders 1 and 2 is due in large part, therefore, to the fact that charging piston 9, being more than 90 degrees ahead of explosion pistons 5 (actually 135 degrees ahead in this embodiment) are able to propel a better controlled and more advantageously timed explosive charge into the chambers of the explosion cylinders 1 and 2 and the action of piston 9 is therefore an essential to my "intake booster plan" which constitutes an adequate means for throttle control.

I have illustrated my invention in a simple embodiment thereof. I desire to claim any modifications in functional detail and/or structural detail which pertain to my invention but I forego in this specification any attempt to illustrate or define them fully. One modification I wish to have here expressed relates to the probable value of having a charging cylinder 30 double acting so that one such charging cylinder 30 would be able to supply the two sets of engine units, in which case my Figure 1 would have been shown to consist of firing cylinders 1, 2, 3, and 4, with but one charging cylinder 30.

Having thus described my invention, what I claim as new and desire to secure by Letters Patent is:

1. An internal combustion engine having in combination, a pair of oppositely disposed firing cylinders with their remote ends forming the closed or compression ends thereof, a crank case having a closed chamber therein with which the adjacent ends of said cylinders communicate, a crankshaft journaled in said crank case midway between said cylinders, pistons in said cylinders, connecting rods connecting said pistons and crankshaft respectively so that said pistons are simultaneously at maximum compression, a charging cylinder disposed with its axis at right angles to the axis of said firing cylinders and having a much greater capacity than either of said firing cylinders, a charging piston in said charging cylinder directly connected to and directly driven from said crankshaft, a connecting rod connecting said charging piston to said crankshaft, a carburetor connected to said charging cylinder, said firing cylinders having exhaust ports at one side thereof respectively and inlet ports at their opposite sides respectively located and spaced an appreciable distance from the closed ends of said firing cylinders, said ports being arranged to be uncovered and opened by said pistons, said exhaust ports being farther from the closed ends of said firing cylinders than said inlet ports, conduits leading from adjacent the closed end of said charging cylinder to said inlet ports, said charging piston moving over 100 degrees ahead of said first mentioned piston, valves controlling said inlet ports constructed and arranged to open upon the attainment of a certain pressure whereby a combustible mixture under high pressure will be discharged through said inlet ports when uncovered by said pistons and said pressure is attained to open said valves and there will be a rush of said combustible mixture through said inlet ports which will assist in expelling exhaust gases through said exhaust ports and whereby said charging piston by being over 100 degrees in advance of said first mentioned pistons will have a long period in which to create said pressure.

2. The structure set forth in claim 1, auxiliary inlet ports adjacent said inlet ports, conduits leading to said auxiliary inlet ports having open ends communicating with the atmosphere and their other ends open and disposed in said chamber whereby when said firing pistons approach the end of their firing strokes, air will be compressed in said chamber and air in said chamber will pass through said last mentioned conduits into said auxiliary inlet ports before said combustible mixture is discharged through said inlet ports and will assist in forcing said exhaust gases through said exhaust ports.

3. An internal combustion engine having in combination, a pair of oppositely disposed firing cylinders with their remote ends forming the closed or compression ends thereof, a crank case having a closed chamber therein with which the adjacent ends of said cylinders communicate, a crankshaft journaled in said crank case midway between said cylinders, firing pistons in said cylinders, connecting rods connecting said pistons and crankshaft respectively so that said pistons are simultaneously at maximum compression, a charging cylinder disposed with its axis at right angles to the axis of said firing cylinders and in line with said crankshaft, a charging piston in said charging cylinder, a connecting rod connecting said charging piston to said crankshaft so that said charging piston moves substantially 135 degrees ahead of said firing pistons, a carburetor connecting to said charging cylinder, said firing cylinders having exhaust ports at one side thereof respectively and having inlet ports at their opposite sides respectively, both of said ports being spaced from the closed ends of said cylinder said ports being arranged to be uncovered and opened by said firing cylinders, conduits leading from adjacent the closed end of said charging cylinder to said inlet ports, valves controlling said inlet ports constructed and arranged to open upon the attainment of substantially 35 pounds pressure in said conduits whereby a combustible mixture will be discharged through said inlet ports when uncovered by said pistons and there will be a rush of said combustible mixture through said ports which will assist in expelling said exhaust gases through said exhaust ports and whereby said charging piston by being 135 degrees in advance of said first mentioned pistons will have a very long period in which to create said pressure.

4. The structure set forth in claim 3, auxiliary inlet ports adjacent said inlet ports, conduits leading to said inlet ports having open ends communicating with the atmosphere and their other ends open and disposed in said chamber whereby when said firing pistons approach the end of their firing strokes, air will be compressed in said chamber and air in said last mentioned conduits and from said chamber will pass through said last mentioned conduits at a pressure of substantially 4½ pounds into said auxiliary inlet ports before said combustible mixture is discharged through said inlet ports and will assist in forcing said exhaust gases through said exhaust ports.

5. An internal combustion engine of the two-cycle type having in combination, a pair of oppositely disposed firing cylinders with their remote ends forming the closed or compression ends thereof, a crank case having a closed chamber therein with which the adjacent ends of said cylinders communicate, a crankshaft journaled in said crank case midway between said cylinders, pistons in said cylinders respectively, connecting rods connecting said pistons and crankshaft respectively so that said pistons are simultaneously at maximum compression, said cylinders having exhaust ports at one side thereof and having inlet ports for a combustible mixture in the opposite sides thereof, auxiliary inlet ports for air adjacent said inlet ports, all of said ports being opened and closed by said pistons, means for delivering air from said crank case into said cylinders through said auxiliary inlet ports, a third cylinder, a third piston movable in said cylinder and moving to its compression maximum at least 90 degrees ahead of said first mentioned pistons, means for supplying fuel to said third cylinder, conduits extending from said third cylinder to said fuel inlet valves respectively, valves in said last mentioned conduits adapted to be opened upon substantially 35 pounds pressure, said crank case, air and said fuel mixture from said third cylinder being charged into said cylinders while said exhaust ports are still uncovered by said pistons.

CHARLES HARLAN WARD.

References Cited in the file of this patent

UNITED STATES PATENTS

| Number | Name | Date |
| --- | --- | --- |
| 779,778 | Hager | Jan. 10, 1905 |
| 954,208 | Richard | Apr. 5, 1910 |
| 973,820 | Scott | Oct. 25, 1910 |
| 976,858 | Easthope | Nov. 29, 1910 |
| 1,042,975 | Sailer | Oct. 29, 1912 |
| 1,046,392 | Kessler | Dec. 3, 1912 |
| 1,070,985 | Reuter | Aug. 19, 1913 |
| 1,087,835 | Schickel | Feb. 17, 1914 |
| 1,255,462 | Radovanovic | Feb. 5, 1918 |
| 1,671,781 | Schaer | May 29, 1928 |
| 1,678,956 | Schaer | July 31, 1928 |
| 2,011,804 | DuBois | Aug. 20, 1935 |
| 2,383,336 | Moore | Apr. 21, 1945 |

FOREIGN PATENTS

| Number | Country | Date |
| --- | --- | --- |
| 168,066 | Great Britain | Nov. 20, 1922 |
| 426,005 | Germany | Mar. 2, 1926 |